July 10, 1945.　　　　E. A. NIX　　　　2,380,369
VALVE GEAR MECHANISM
Filed July 8, 1943　　　　4 Sheets-Sheet 1

INVENTOR
EDMUND A. NIX
BY Fetherstonhaugh & Co.
ATTORNEYS

July 10, 1945.  E. A. NIX  2,380,369
VALVE GEAR MECHANISM
Filed July 8, 1943  4 Sheets-Sheet 2
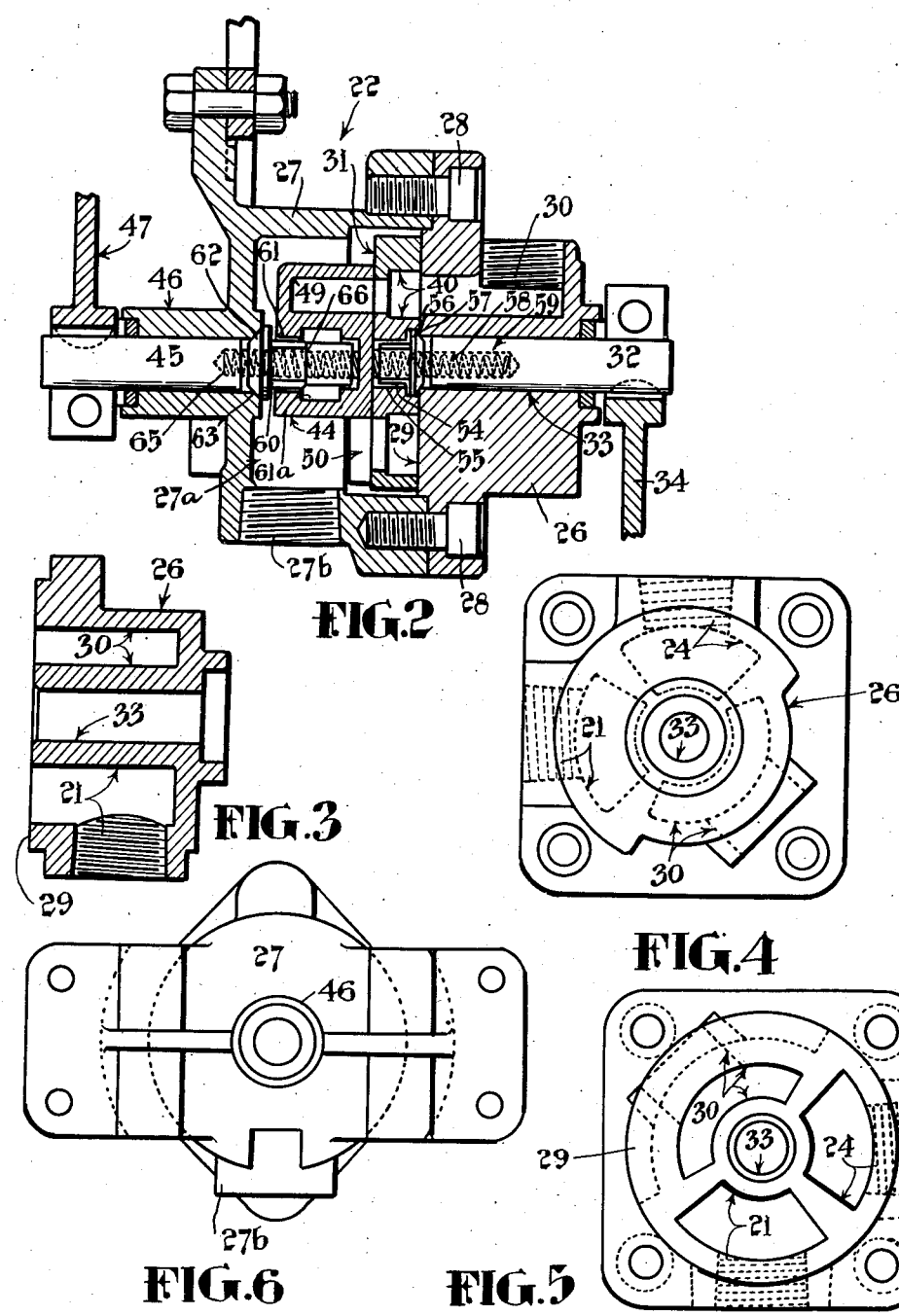
INVENTOR
EDMUND. A. NIX
BY Fetherstonhaugh & Co.
ATTORNEYS July 10, 1945.　　　　　E. A. NIX　　　　　2,380,369
VALVE GEAR MECHANISM
Filed July 8, 1943　　　　　4 Sheets-Sheet 3

INVENTOR
EDMUND. A. NIX
BY Featherstonhaugh & Co.
ATTORNEYS

INVENTOR
EDMUND. A. NIX
BY Featherstonhaugh & Co.
ATTORNEYS

Patented July 10, 1945

2,380,369

UNITED STATES PATENT OFFICE 2,380,369

VALVE GEAR MECHANISM

Edmund A. Nix, Montreal, Quebec, Canada, assignor to Dominion Hoist & Shovel Company Limited, Lachine, Quebec, Canada Application July 8, 1943, Serial No. 493,883

4 Claims. (Cl. 121—41)

This invention relates to valve-gear for controlling the operation of a fluid motor and is herein described as applied to a compressed-air motor of the reciprocating piston type.

An object of this invention is to provide valve-gear mechanism especially adapted for controlling the bucket operating motor of the loading machine described and claimed in my U. S. Patent No. 2,334,835, granted Nov. 23, 1943.

Another object is to provide a generally improved and simplified reversing valve-gear mechanism of semi-automatic type in which a manually operable valve member and a cooperating automatic or floating valve member conjointly control the flow of pressure fluid to and from the cylinder of a fluid motor, the manually operable valve being shiftable relatively to the automatic valve to thereby establish connections through which pressure fluid is supplied to and exhausted from different portions of the motor cylinder to thereby operate said piston and said automatic valve being operated by the piston to disrupt said connections when the piston has completed a travelling movement which, in direction and extent, is predetermined by the direction and extent of the aforesaid shifting of the manually operable valve relative to the automatic or floating valve.

Other objects, advantages and characteristic features of the invention will be more readily understood from the following detailed description taken in connection with the accompanying drawings, in which—

Fig. 2 is a longitudinal sectional view of a valve assembly forming part of my improved valve-gear mechanism.

Fig. 3 is a longitudinal sectional view of the body portion of the valve casing shown in Fig. 2.

Fig. 4 is an inner-end elevation of the casing section shown in Fig. 3.

Fig. 5 is an outer-end elevation of the casing section shown in Fig. 3.

Fig. 6 is an outer-end elevation of the cover section of the valve casing shown in Fig. 2.

Figure 1:
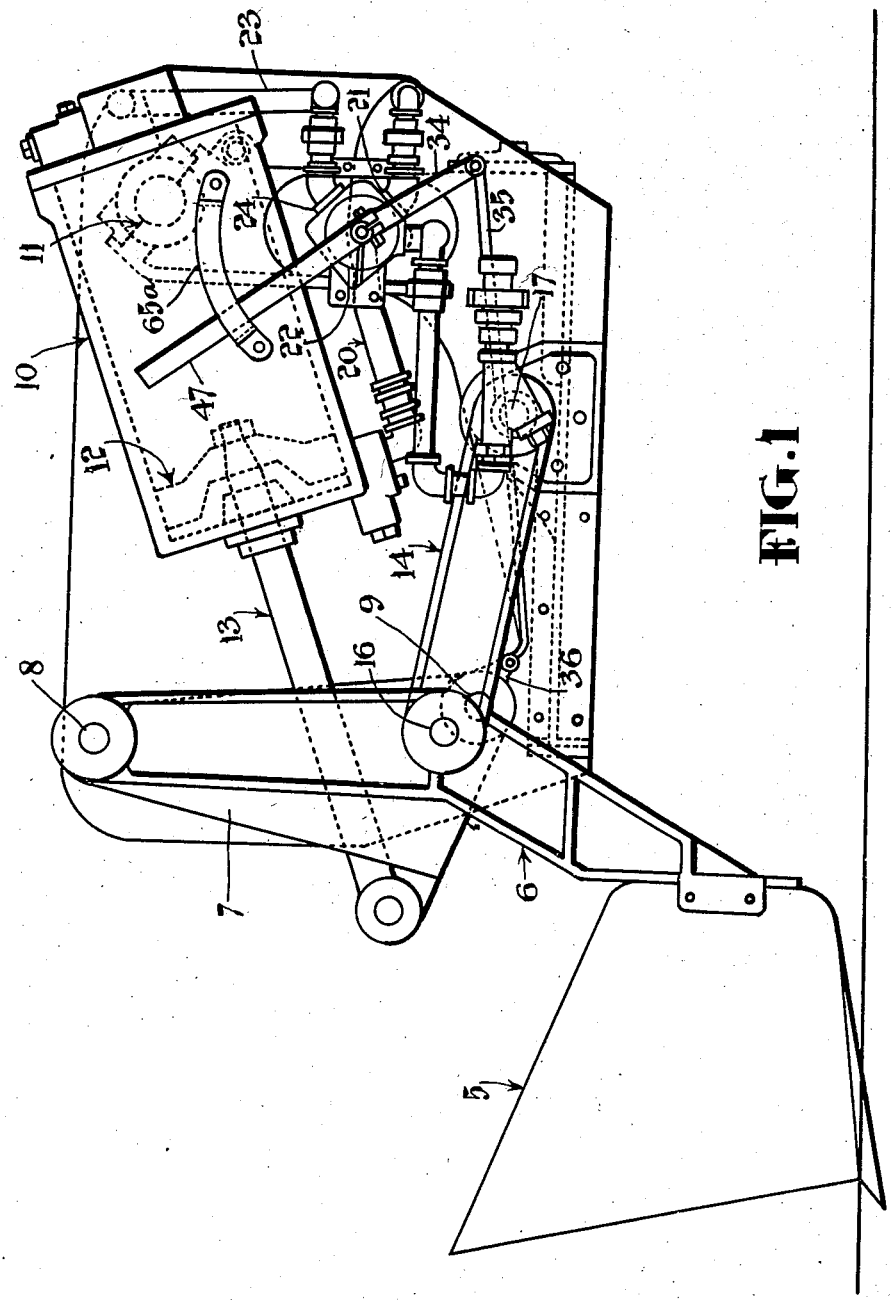
Fig. 1 is a side elevational view of a loading machine equipped with my invention. In this view I have shown, in side elevation only, those elements of the loading machine which are necessary to an understanding of my invention.
Figure 8:
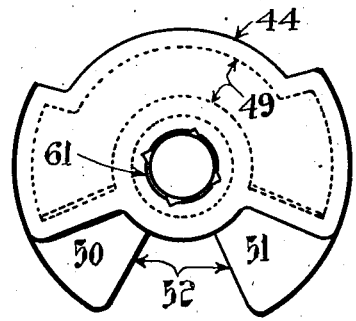
Fig. 8 is an elevation of the outer side of the manually operable valve member of the valve assembly shown in Fig. 2.
Figure 7:
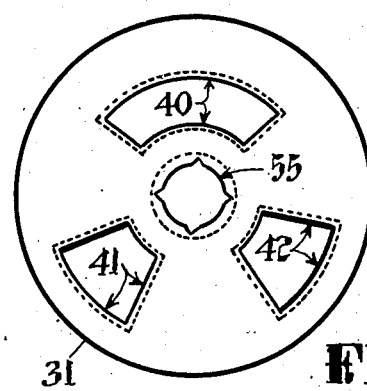
Fig. 7 is a plan view of the inner side of the floating or automatic valve member forming part of the complete valve assembly shown in Fig. 2.

As illustrated in these drawings my improved valve gear is utilized to control an air motor which operates the bucket of a loading machine designed in accordance with the invention set forth in my said Patent No. 2,334,835. Since this type of loading machine is fully described in said co-pending application the following reference thereto is deemed sufficient for present purposes.

The loading bucket 5 is carried between and rigidly secured to the lower ends of a pair of bucket carrying arms 6 (only one of which is shown in the present drawings). The bucket carrying arms are normally disposed in the vertical position shown in Fig. 1 and their upper ends are secured to the upper end of a normally vertical boom 7 by pivotal connections 8. The lower end of boom 7 is keyed to a rock shaft 9 which constitutes a pivotal axis about which the boom is swung by an operating motor comprising an air cylinder 10 mounted to swing about a horizontal axis 11, a reciprocating piston 12 working in said cylinder and a piston rod 13 connected between said piston and an intermediate portion of said boom.

A bucket-actuating link 14 is associated with each shovel arm 6, the forward end of the link being pivotally connected to an intermediate portion of the arm as indicated at 16 and the rear end of the link being mounted to swing about a fixed horizontal axis 17.

In Fig. 1 the component parts of the loading machine are shown in the loading position. When the bucket 5 has been filled and it is desired to dump the same, this is accomplished in the following manner: Air under pressure is supplied to the left hand end of cylinder 10 so that piston 12 is caused to travel to the right and, in so doing, swings the boom 7 downwardly and rearwardly about the pivotal axis afforded by rock shaft 9. If the supply of air to the left hand end of the cylinder is continued until the piston makes a full stroke to the right the boom 7 will be swung to a horizontal position extending rearwardly from the rock shaft 9. During this movement of the boom the links 14 serve to swing the bucket carrying arms 6 upwardly and rearwardly about their pivotal connections 8 so that, by the time the boom 7 reaches its rearwardly extending horizontal positon, the bucket 5 will be disposed in a dumping position at the rear of the machine. In this connection it may be explained that boom 7 is swung through an angle of approximately 90° about the pivotal axis afforded by rock shaft 9 and that the bucket carrying arms 6 are swung through an angle of approximately 90° about their pivotal connections 8. When it is desired to restore the parts to the loading position air under pressure is supplied to the right hand end of cylinder 10 and the air previously supplied to the left hand end of said cylinder is exhausted therefrom. This causes the piston 12 to travel to the left and, in so doing, to restore the boom 7 to its original vertical position. At the same time the links 14 function to swing the bucket carrying arms 6 upwardly and forwardly about their pivotal connections 8 so that by the time the boom 7 reaches its vertical position the bucket 6 is restored to its loading position in front of the machine.

Air is supplied to and exhausted from the left hand end of cylinder 10 through a conduit 20 having one end connected to the cylinder port 21 of a valve casing 22. A similar air supply and exhaust conduit 23 is connected between the right hand end of said cylinder and a second cylinder port 24 of valve casing 22.

Valve casing 22 (see Figs. 2 to 13 inclusive) comprises a body section 26 and a cover section 27 fastened together by stud bolts 28 or other suitable fastening means. The cylinder ports 21 and 24 are formed in the body section 26 and are here shown as L-shaped ports extending outwardly from a valve seat 29 formed by the inner end of the body section. The body section 26 is also provided with an exhaust port 30 extending outwardly from valve seat 29. A valve disk 31 is fitted against valve seat 29 and is driven by the inner end of a valve stem 32 which is rotatably mounted in a central opening 33 of body section 26. The outer end of stem 32 (compare Figs. 1 and 2) is connected by crank arm 34, link 35 to a crank arm 36 of rock shaft 9. It will thus be seen that valve disk 31 is mechanically interconnected with piston 12 so that movement of the piston in either direction will effect a corresponding rotary movement of disk 31 about the axis afforded by valve stem 32.

Valve disk 31 is provided with an exhaust port 40 and two cylinder ports 41 and 42. Exhaust port 40 is always in communication with the previously mentioned exhaust port 30 and the cylinder ports 41 and 42 are always in communication, respectively, with the previously mentioned cylinder ports 21 and 24.

A second valve disk 44 is rotatably seated against the inner side of valve disk 31 and is fitted onto the inner end of an operating stem 45 which extends outwardly through a bonnet extension 46 of the valve casing cover section 27 and is provided, at its outer end, with a hand lever 47.

Valve disk 44 is provided with an exhaust port 49 which is always in communication with the exhaust port 40 of valve disk 31. Valve disk 44 is also provided with two port covering vanes 50 and 51 which are separated from each other by a gap 52 and which, respectively, control the cylinder ports 41 and 42 of valve disk 31. At this point it may be explained that the port covering vanes 50 and 51 of valve disk 44 control the establishment and disruption of communication between valve ports 41 and 42 and the hollow valve casing cover section 27 which constitute a pressure chamber 27a provided with an air inlet port 27b to which air under pressure is applied from a compressor or any other suitable source. It may also be explained here that whenever one of the cylinder ports 41 and 42 of valve disk 31 is uncovered by its control vane and thus placed in communication with pressure chamber 27a the other cylinder port of said disk will be connected to exhaust port 40 by the exhaust channel 49 of valve disk 44.

The stem 32 of valve disk 31 is formed with a polygonal inner end portion 54 which is fitted in a complementary opening 55 to establish a torque transmitting connection between these parts. Valve stem 32 is also provided, immediately adjacent the polygonal portion 54, with an enlargement 56 having a conical surface which bears against a conical seat 57 provided at the inner end of valve-stem opening 33. A coil spring 58 is fitted in a bore 59 extending inwardly from the inner end of stem 32 so that said spring is compressed between the central portion of valve disk 44 and the inner closed end of said bore.

Valve stem 45 of valve disk 44 is also provided with a polygonal portion 60 which cooperates with a complementary portion 61 of a stem-receiving socket 61a to establish a torque transmitting connection between these parts. Valve stem 45 is also provided with an enlargement 62 having a conical surface which bears against a conical seat 63 provided at the inner end of the bonnet extension 46. A coil spring 65 is also arranged in a bore 66 of stem 45 and is compressed between the inner end of said bore and the bottom wall of socket 61a. Spring 65 is made sufficiently stronger than spring 58 to ensure that pressure sealing contact is maintained between the engaging sides of valve disks 44 and 31 and between the outer side of valve disk 31 and the seat 29.

Figure 9:
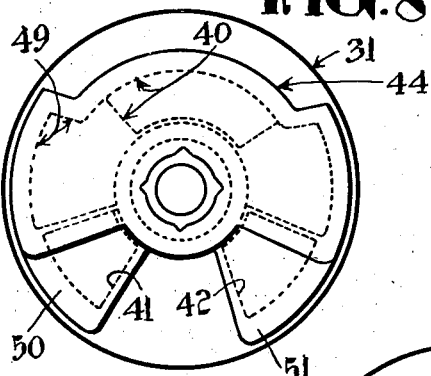
Figs. 9 to 13 are diagrams illustrating the manner in which the two previously mentioned valves are shifted relatively to each other to control the operation of the air motor of the loading machine shown in Fig. 1.
Figure 10:
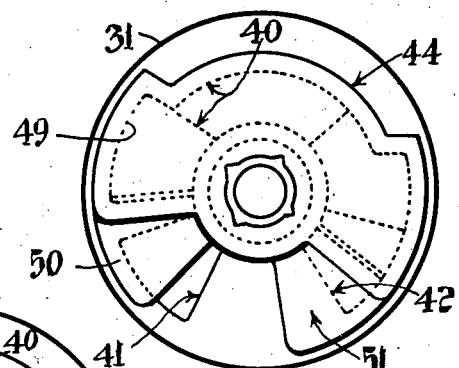
Figure 11:
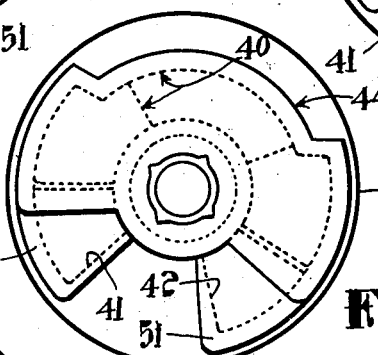

In explaining the complete operation of my improved valve gear as applied to the control of the air motor shown in the present drawings it will be assumed that bucket 5 and piston 12 are in the position shown in Fig. 1 and that valve disks 31 and 44 are relatively arranged as shown in Fig. 9 so that the cylinder ports 41 and 42 of valve disk 31 are completely covered by vanes 50 and 51 of valve disk 44. Since ports 41 and 42 of disk 31 are cut off from communication with air pressure inlet 27b (Fig. 1) and from exhaust ports 49, 40 and 30, it follows that cylinder ports 21 and 24 of valve casing section 26 are completely blocked so that there is no flow of air to or from either end of cylinder 10. Consequently, piston 12 will be held in the position shown in Fig. 1. If hand lever 47 is now swung in a clockwise direction to shift valve disk 44 to the position shown in Fig. 10 the resulting partial uncovering of port 41 by vane 50 will permit compressed air to flow through ports 41 and 21 and conduit 20 to the left hand end of cylinder 10 and to act against piston 12 to move the latter to the right. At the same time the vane 51 and the exhaust port 49 of valve disk 44 are shifted so that port 49 provides a connecting passage between the cylinder port 42 and exhaust port 40 of valve disk 31. This permits air to be exhausted from the right hand end of cylinder 10 through conduit 23, cylinder port 42 and exhaust ports 49, 40 and 30. As the piston 12 travels to the right the resulting rotation of rock shaft 9 acts, through the crank arm 36, link 35 and crank arm 34 to turn the valve disk 31 in the same clockwise direction in which the valve disk 44 was previously turning by the aforesaid operation of hand lever 47. The movement of piston 12 and the resulting turning movement of disk 31 continues until the ports 41 and 42 are again completely covered by the vanes 50 and 51 of valve disk 44 as shown in Fig. 11. When this condition obtains the cylinder ports 21 and 24 of valve casing 22 are again completely blocked so that piston 12 will come to rest and be held in its new position. If it is desired to effect a further movement of piston 12 to the right the hand lever 47 is given a further movement in the same direction as before so that the port 41 of valve disk 31 is again either partially or completely uncovered by the resulting turning movement of valve disk 44. The angle through which vane 50 is moved in a clockwise direction relative to port 41 determines the distance which the piston 12 travels before port 41 is shifted to a position where it is again completely covered and blocked by said vane.

Figure 12:
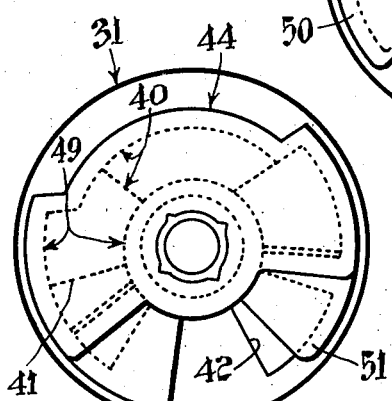
Figure 13:
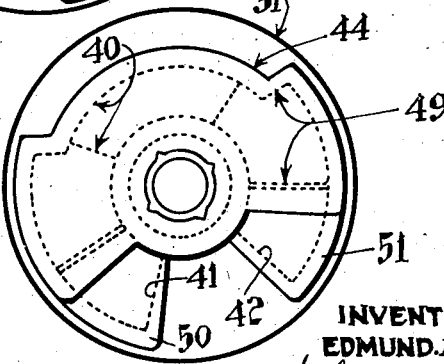

When piston 12 is to be shifted to the left, hand lever 47 is swung in an anti-clockwise direction to turn valve disk 44 to a port-uncovering position such, for example, as that shown in Fig. 12. In this case vane 51 of disk 44 has been shifted to partly uncover port 42 of disk 31 and vane 50 and exhaust port 49 of disk 44 have also been shifted so that port 49 provides a connecting passage between cylinder port 41 and exhaust port 40 of disk 31. Under these conditions compressed air will flow from pressure chamber 27a to the right hand end of cylinder 10 via ports 42 and 24 and conduit 23. At the same time the left hand end of cylinder 10 will be connected to exhaust via conduit 20, cylinder port 41 of valve disk 31 and exhaust ports 49, 40 and 30. The piston 12 will thus be caused to travel to the left until the resulting rotation of disk 31 in an anti-clockwise direction has shifted the ports 41 and 42 to a position (Fig. 13) where they are again blocked by the vanes 50 and 51 of the previously shifted disk 44.

The length of the arc through which the hand lever 47 is movable is controlled by the quadrant 65a and is predetermined so that the maximum angle through which the disk 44 is turned by a full stroke of said lever is the same as the maximum angle through which valve disk 31 is turned by the full stroke of the piston 12. It will also be apparent that the angle through which lever 47 is turned to uncover one of the ports 41 and 42 of valve disk 31 predetermines the angle through which said disk 31 must be turned by piston 12 to again cover ports 41 and 42 so that they are completely blocked by the vanes 50 and 51. From this it follows that the angle through which lever 47 is moved at each operation determines the distance which piston 12 travels before it is brought to rest and that the direction of movement of lever 47 determines the direction of movement of said piston.

In the foregoing I have described a step by step operation of piston 12 which is often desirable in operating the bucket 5 to either a loading or unloading position or to some intermediate position. However, it will be apparent that, with piston 12 at one end of cylinder 10, a single-throw movement of lever 47 from one end to the other of quadrant 65 will result in positioning the valve disk 44 so that the piston will make a complete stroke toward the opposite end of the cylinder before being brought to rest by the resulting turning of ports 41 and 42 to a blocked position.

Figure 14:
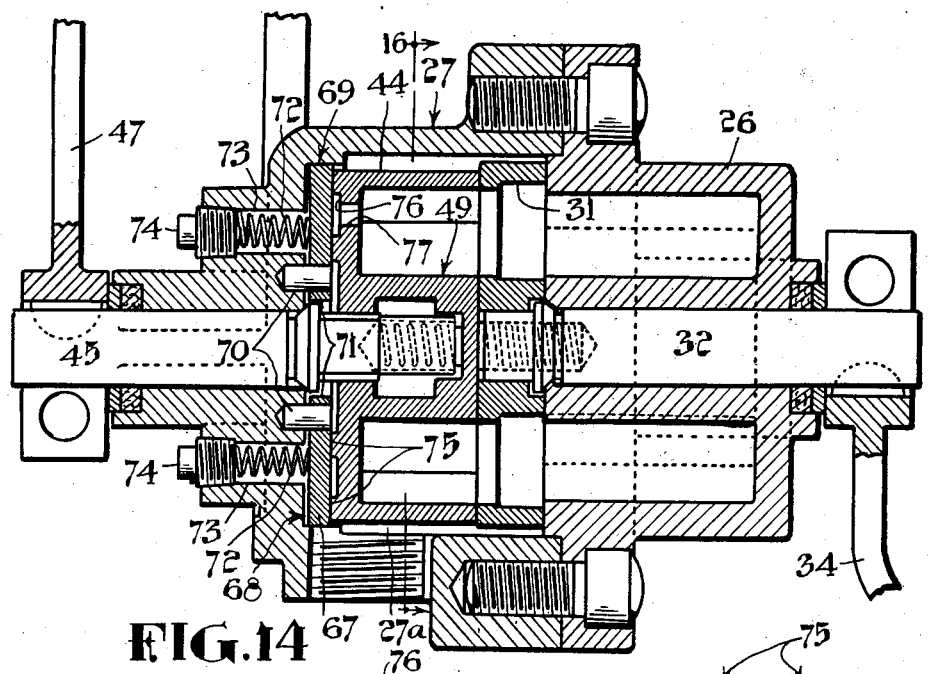
Fig. 14 is a view, similar to Fig. 2, but shows a modifications in which a holding disc is arranged in pressure contact with the manually operable control valve to frictionally retain the latter stationary in any position to which it is turned by the associated hand lever.

In Fig. 14 a holding disk 67 is shown interposed between the outer side of valve disk 44 and the adjacent opposing wall 68 of the valve casing cover section 27. Disk 67 is slidably fitted in a recess 69 and is held against turning movement by dowels 70. These dowels project outwardly from the wall 68 to which they are rigidly secured and fit loosely in suitable openings 71 provided in disk 67. Springs 72 are arranged in openings 73 of wall 68 so that the inner ends of the springs bear against the outer side of disk 67. The outer ends of springs 72 bear against plugs 74 which are screwed into the outer ends of openings 73 and may be adjusted to place the springs under any desired degree of compression. The inner side of disk 67 bears against an annular facing 75 formed on the outer side of valve disk 44, said facing being recessed to provide a central channel 76 which is placed in communication with exhaust port 49 by one or more suitable openings 77.

Figure 16:
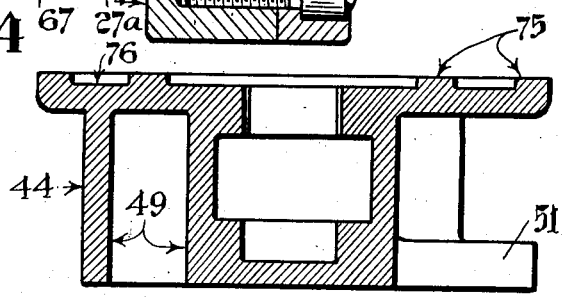
Fig. 16 is a section taken substantially along the line 16—16 of Fig. 14.
Figure 15:
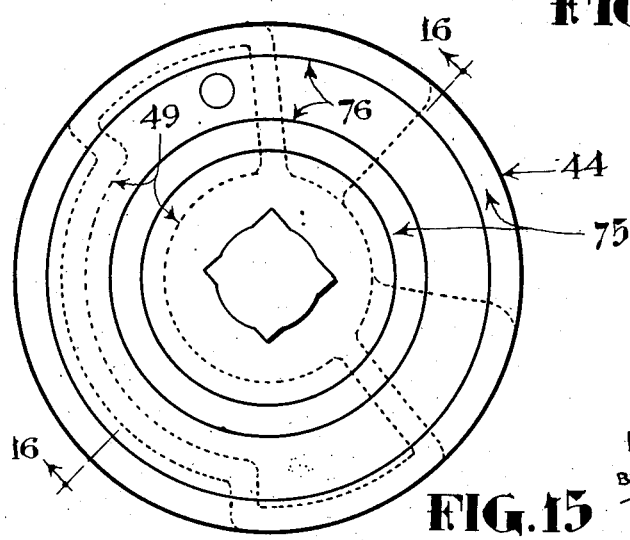
Fig. 15 is a plan view of the outer side of the slightly modified form of manually operable valve included in the assembly shown in Fig. 14.

The utility and advantages of the modified arrangement disclosed in Figs. 14 to 16 inclusive will be apparent from the following explanation: The fluid pressure supplied to pressure chamber 27a causes a definite bias on valve disk 44 whose total effect is a thrust between the engaging faces of valve disk 44 and valve disk 31. The amount of this thrust will be the fluid pressure in p. s. i. times the projected area of valve disk 44 in square inches. The effect of this thrust will be to produce a friction moment which resists the turning motion of valve disk 44 and thus requires effort at the end of hand lever 47 to produce a turning of disk 44. The effective radius at which the thrust can be considered to act will approximate the mean radius of disk 44 and the friction torque on said disk will be $Pfr.$, where $P$=thrust in pounds, $f$=coefficient of friction between the engaging faces of valve disks 44 and 31, and $r$= mean radius of disk.

It will now be assumed that disk 44 has been turned through a definite angle, by operation of hand lever 47, to establish connection through which pressure fluid is supplied to one end of the motor cylinder and is relieved from the opposite end of said cylinder. After lever 47 has been moved to its new position and stopped, the piston actuated disk 31 will begin to rotate in the same direction and, due to the friction torque exerted between the disks 44 and 31, will tend to rotate the disk 44 past its stopped position unless the lever 47 is definitely held in position.

In the particular application illustrated in the present drawings it is undesirable to provide lever latching devices or other lever-engaging holding means for retaining the lever 47 in its different positions of adjustment. In the arrangement shown in Figs. 14 to 16 the use of such lever holding devices is avoided by the provision of a holding disk 67. If holding disk 67 is made of the same material and has the same coefficient of friction as valve disk 31, the area of the annular facing 75 should equal the projected area of valve disk 44 on its inner face. In this case the fluid pressure acting on the outer side of holding disk 67 will produce a thrust between this disk and the annular facing 75 which is equal to the thrust between valve disks 44 and 31 since the projected areas are equal. The mean or effective radius of holding disk 67 is made greater than the mean radius of valve disk 44. The friction torque produced by the stationary holding disk 67 will therefore exceed the friction torque produced by valve disk 44 on valve disk 31. Therefore any motion of valve disk 31, while valve disk 44 is stationary, will not affect the stationary condition of disk 44, the latter disk being held stationary by the superior friction torque produced on it by holding disk 67.

The required area of the annular facing 75 depends on the relation between the friction coefficients of disks 67 and 31 and may be reduced in those cases in which the holding disk is made from some material furnishing a higher coefficient of friction as compared with the material from which the disk 31 is made. In the latter instance the area required for the annular facing 75 on disk 44 could be reduced while still giving an excess of friction torque over that produced by the inner face of disk 44 which is in pressure contact with disk 31. The advantage gained from the use of a high coefficient on the annular face of disk 44 is the reduction of total thrust and total friction torque on disk 44 which has to be overcome by effort applied to lever 47.

Having thus described what I now consider to be the preferred embodiment of this invention it will be apparent that various modifications may be resorted to within the scope and spirit of the invention as defined by the appended claims.

I claim:

1. A valve assembly including a valve casing affording a pressure chamber provided with a fluid pressure inlet, a valve seat forming one defining wall of said chamber, an exhaust port and two distributing ports opening into said chamber through said valve seat, a valve rotatably engaged with said seat and provided with an exhaust port and two distributing ports, said last mentioned exhaust port being in constant communication with the first mentioned exhaust port and each of said last mentioned distributing ports being in constant communication with one of said first mentioned distributing ports, a second valve rotatably engaged with said first mentioned valve, said second valve being provided with an exhaust channel and with two port-covering elements which are separated from each other by an intervening gap, said exhaust channel being in constant communication with the exhaust port of the first mentioned valve and each of said port-covering elements serving to control one of the distributing ports of the first mentioned valve, means for operating the second mentioned valve to a position such that one port-covering element of said valve is shifted to uncover and thereby place the associated distributing port of the first mentioned valve in communication with said pressure chamber and so that the exhaust channel of said second mentioned valve is positioned to provide a connecting passage between the exhaust port and the remaining distributing port of the first mentioned valve, means for subsequently operating the first mentioned valve relatively to the second mentioned valve to change the relative setting of the valves so that both ports of the first mentioned valve are again completely covered by said port-covering elements to thereby disrupt the fluid connections previously established by the shifting of the manually operable valve, a disk slidably interposed between the second valve and a wall of the pressure chamber located opposite said valve seat, spring means acting against said disk to hold the same in pressure contact with the adjacent side of said second valve to hold the latter stationary against the turning torque to which it is subjected by the turning movement of the first mentioned valve, and disk-restraining means holding said disk against rotation but permitting it to move in a direction perpendicular to the engaging side of said second valve.

2. A valve assembly as set forth in claim 1, in which said disk engages an annular facing formed on and projecting from the adjacent side of said second valve, said facing being recessed to provide a central channel in communication with the exhaust port of said second valve.

3. A valve assembly including a valve casing affording a pressure chamber provided with a fluid pressure inlet, a valve seat forming one defining wall of said chamber, an exhaust port and two distributing ports opening into said chamber through said valve seat, a valve rotatably engaged with said seat and provided with an exhaust port and two distributing ports for cooperation with the exhaust and distributing ports of the valve seat, a second valve rotatably engaged with the side of the first mentioned valve remote from the valve seat, said second valve being provided with an exhaust channel and with two port-covering elements for cooperation with the exhaust and distributing ports of the first mentioned valve, a valve stem extending through a central opening in the valve seat portion of the valve casing and through a registering central opening provided in the first mentioned valve, the inner end of said stem having driving engagement with said first mentioned valve and being provided with a socket containing a spring bearing against the central portion of the second valve, a second valve stem extending inwardly through a central opening in the wall of the pressure chamber opposed to said valve seat and into a socket provided in the central portion of the second valve, the inner end of said stem being in driving engagement with a surrounding wall portion of said socket and being provided with a recess containing a spring bearing against the bottom wall of said socket, and means for independently rotating said valves in relation to each other and to said valve seat.

4. A valve assembly including a valve casing affording a pressure chamber provided with a fluid pressure inlet, a valve seat forming one defining wall of said chamber, an exhaust port and two distributing ports opening into said chamber through said valve seat, a valve rotatably engaged with said seat and provided with an exhaust port and two distributing ports for cooperation with the exhaust and distributing ports of said valve seat, a second valve rotatably engaged with the side of the first mentioned valve remote from said valve seat, said second valve being provided with an exhaust channel and with two port-covering elements for cooperation with the exhaust and distributing ports of the first mentioned valve, a disk slidably interposed between the second valve and the wall of the pressure chamber opposite said valve seat, the side of the second valve opposed to said disk being provided with a projecting annular disk-engaging facing recessed to provide a channel in communication with the exhaust channel of said second valve, springs acting against said disk to hold the same in pressure contact with said annular facing so that said disk is effective to hold said second valve stationary against the turning torque to which said second valve is subjected by the turning movement of the first mentioned valve relative thereto, disk-restraining means serving to prevent rotation of said disk while permitting the latter to have the sliding movement necessary to enable it to be pressed tightly against the annular facing of the second valve by said spring means and means for turning said valves in relation to each other and to said valve seat.

EDMUND A. NIX.